June 24, 1941.    G. K. MANUS    2,246,744
TAILOR'S MEASURING APPARATUS
Filed Aug. 3, 1940    2 Sheets-Sheet 1
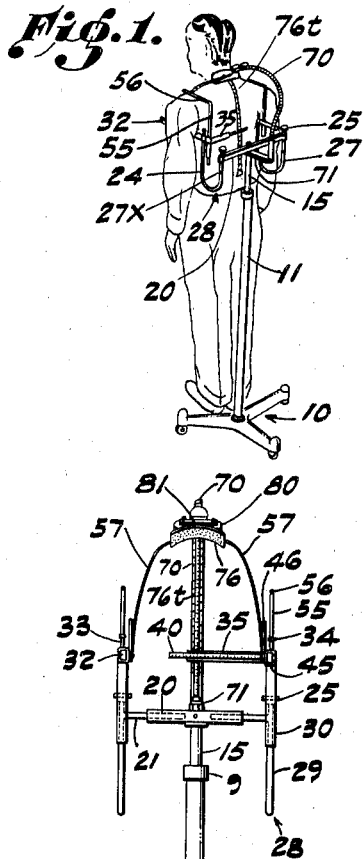
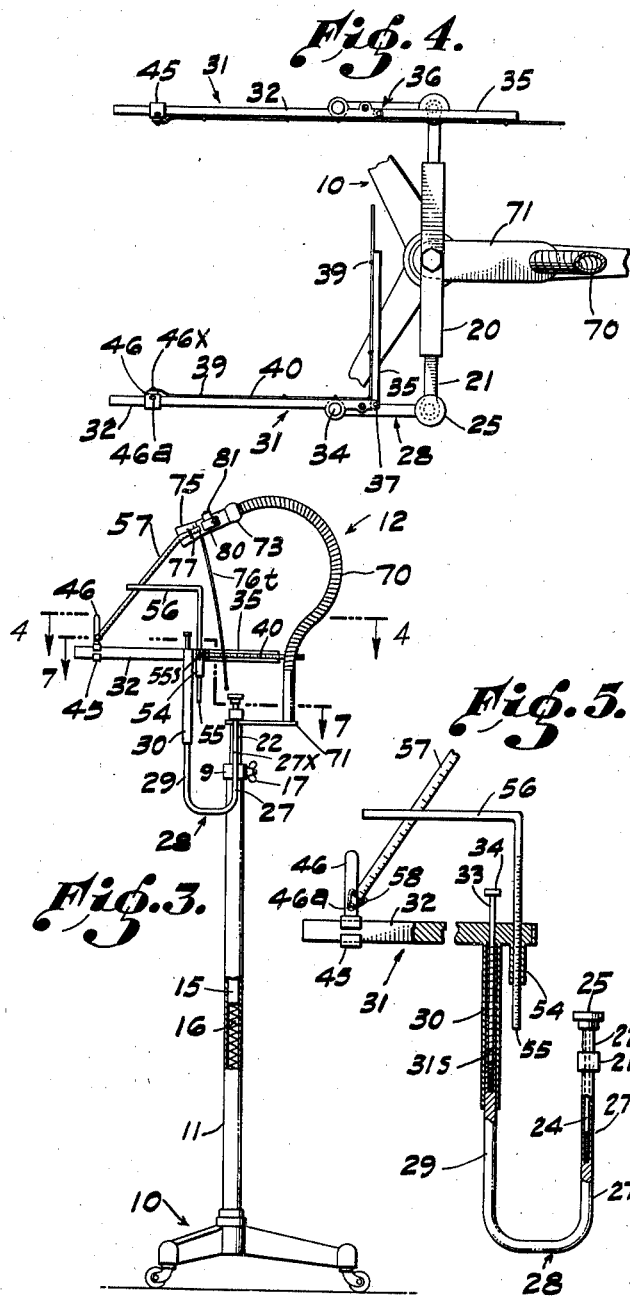
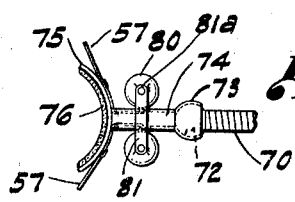
GEORGE K. MANUS,
INVENTOR June 24, 1941.  G. K. MANUS  2,246,744
TAILOR'S MEASURING APPARATUS
Filed Aug. 3, 1940   2 Sheets-Sheet 2
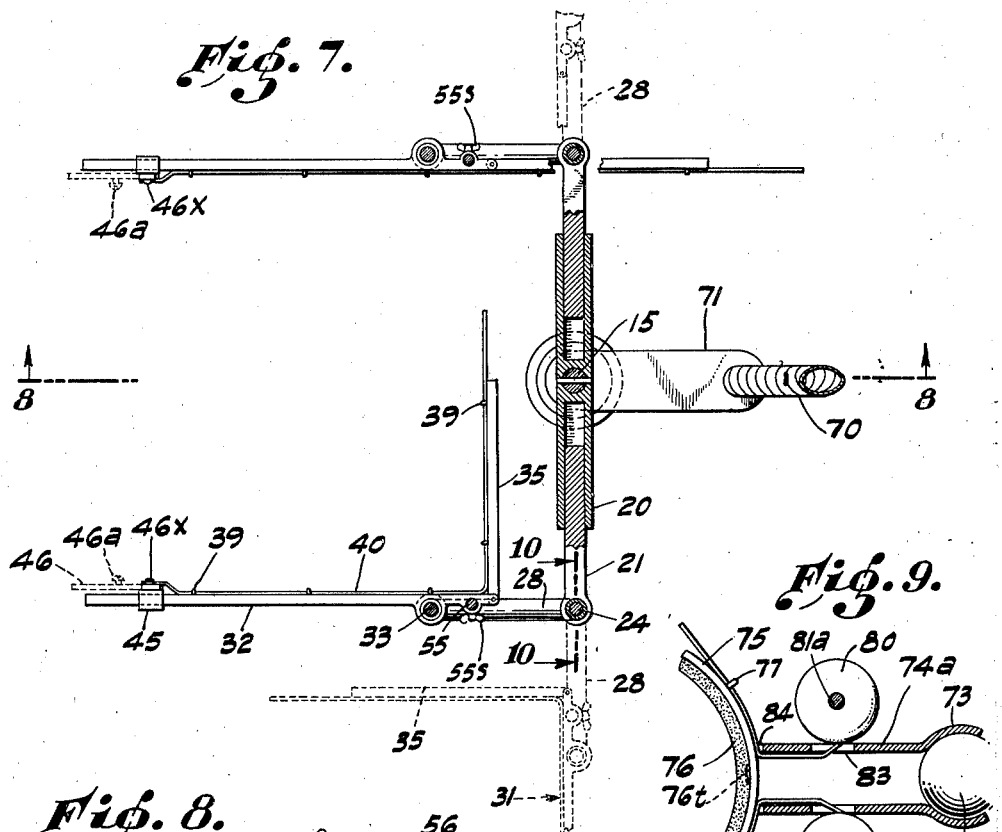
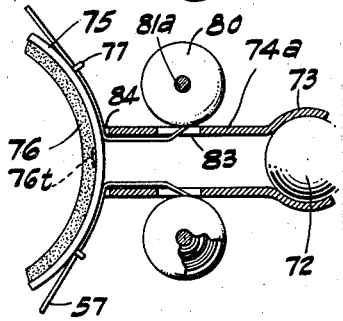
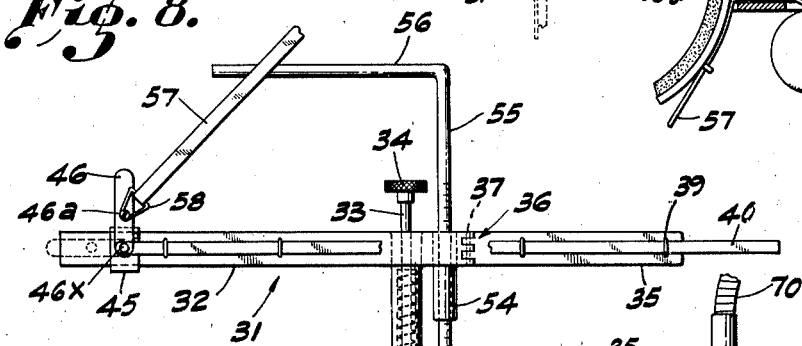
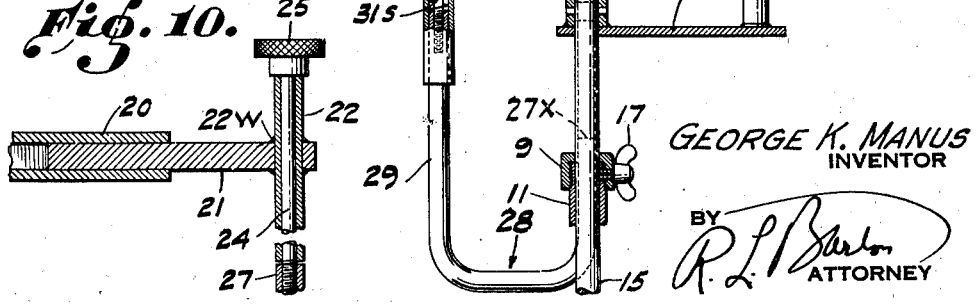
GEORGE K. MANUS
INVENTOR
BY R. L. Barton
ATTORNEY Patented June 24, 1941

2,246,744

UNITED STATES PATENT OFFICE 2,246,744

TAILOR'S MEASURING APPARATUS

George K. Manus, Los Angeles, Calif.

Application August 3, 1940, Serial No. 350,399

18 Claims. (Cl. 33—8)

This invention relates to a tailor's measuring apparatus, and more particularly to an apparatus to enable the tailor quickly and conveniently to make short measurements in designing coats and similar garments, and to do this by means of an assembly of measurement indicating parts which is supported mainly from the floor, instead of as an uncomfortable harness on the body of the person being measured.

One object of the invention is to provide an assembly of cooperating measurement indicating parts wherein gravity and springs acting in opposition to gravity are utilized, in conjunction with a portable, floor supported standard, to bring said measurement indicating parts quickly and conveniently into their operative relation to the requisite parts of the body of the person being measured.

Another object is to provide an apparatus which is supported in an improved manner portably whereby its various parts for indicating the measurements to be taken may be more readily brought into proximity to the customer's body and then more conveniently and quickly adjusted to their proper position.

Another object of the invention is to provide the apparatus with a bendable semi-rigid connection or support which may be flexed to the desired position and contour and then will remain in the position to which it has been adjusted to serve as a support for certain other parts of the apparatus.

Still other objects of the invention relate to simplicity of construction, superior arrangement of certain parts in their relation to each other, and to improved means for adjusting measurement indicating parts of the device both laterally and vertically in relation to the neck, shoulders and subjacent portion of the trunk of the customer's body.

The invention is particularly well adapted for taking short measurements in designing coats or similar garments. It is supported upon the floor by wheels which aid in qualifying it for measuring "depth of scye" and depth of arm hole, and also assists the operator in taking other measurements.

Other objects, advantages and features of invention will hereinafter appear.

Referring to the accompanying drawings, which illustrate what is at present deemed to be a preferred embodiment of the invention, Fig. 1 is a perspective view of the entire apparatus showing the same adjusted in a contacting relation to the upper portion of a customer's body preparatory to taking the measurements required for tailoring a coat or a like garment.

Fig. 2 is a front elevation of the device showing it, per se, adjusted similarly to the position thereof shown in Fig. 1.

Fig. 3 is an elevation looking at the right side of the apparatus shown in Fig. 2.

Fig. 4 is a horizontal section taken on line 4—4 of Fig. 3. This view shows the device on a larger scale than that of Fig. 3 and a portion of the structure is broken away in order to contract the view.

Fig. 5 is a view, partly in side elevation and partly in vertical section, of left upper hand portions of the structure shown in Fig. 1.

Fig. 6 is an enlarged fragmental plan view of parts at the top of the apparatus.

Fig. 7 is an enlarged transverse section taken on the plane indicated by the angular line 7—7 on Fig. 3. In this view dotted lines indicate extended positions of certain parts.

Fig. 8 is a vertical section on the plane of the line 8—8 in Fig. 7.

Fig. 9 is a fragmental, transverse section of parts shown in Fig. 6, on a larger scale than that of the latter view.

Fig. 10 is a vertical section taken on line 10—10 of Fig. 7.

Referring in detail to the drawings, the apparatus comprises a wheeled base 10 carrying an upright tubular standard 11 supporting at its upper end an assembly 12 of measurement indicating rods and flexible connections. Said rods and connections are carried by the upper end portion of a main support consisting of an upright bar 15 which is slidably fitted within the tubular standard 11, said standard containing a compression spring 16 upon which the lower end of said bar rests. The upper end portion of the standard 11, a fragment of which is shown in Fig. 8, has screwed on to it a collar or apertured cap 9 and is furnished with a winged set screw 17 which extends through said collar and standard and maintains the bar 15 in the desired adjusted position after it has been depressed to the desired extent against the opposition of the spring 16.

The bar 15 has rigidly secured to its upper end a horizontal tubular cross bar 20 into each end of which slidably fits a square carrier rod 21. Each of said carrier rods constitutes one arm of a jointed bracket which carries at its outer end a vertical, tubular cross arm 22 which is shown in Fig. 10 as being fitted within a suitable vertical aperture in the outer portion of the rod 21, and secured in such position by means of welds 22w.

Within each of said vertical arm 22 is turnably fitted a hanger rod 24 having at its upper end a milled head 25. Said hanger rod is screw-threaded throughout its lower end portion in order that it may be screwed into the socket of the shorter limb 27 of a U-shaped bracket 28, the line of rotation between said bracket and its support being indicated at 27x in Fig. 5. The long limb 29 of said bracket also having a screw threaded socket in its upper end portion. The latter end portion of said bracket turnably and slidably fits within a tubular arm 30 which depends from and is preferably made integral with a horizontal side gage bar 31, the compression spring 31s tending to lift the tubular arm 30 together with the parts it carries. In axial alinement with said tubular arm 30, said side gage bar has a bore through it through which it extends, with a turnable fit, a vertical mounting rod 33 carrying at its upper end a milled head 34, the lower end of said mounting rod screwing into the top part of yoke arm 29.

The side gage bar 31 behind and adjacent to the mounting rod 33, carries a horizontally swingable back section 35 which is shown connected to it by means of a dove-tail joint 36 (see Fig. 8) including a pivot 37. The sections 32 and 35 of the side gage bar 31 are both provided on their inner sides (see Fig. 7) with keepers 39 which hold in place a calibrated blade 40. The front end portion of the arm section 32 has slidably fitted upon it a carriage 45, having a finger 46 pivoted to its side at 46x in a friction tight manner to swing in a vertical plane as shown in Fig. 8. The front end of said blade 40 is fastened to the pivot 46x of carriage 45.

Adjacent to its junction with its section 35, the side arm section 32 carries a depending stub sleeve 54 within which slidably and turnably fits the calibrated lower arm 55 of the angular depth of armhole gage bar 56. A winged set screw 55s (see Fig. 7) maintains said depth of armhole gage bar 56 in its adjusted position. Previously described finger 46 carries a laterally extending anchor screw 46a to which is securable a calibrated tape 57 (frequently called "strap" in the tailoring trade) by means of the wire loop 58 through which the adjacent end portion of said tape passes. This tape or strap cooperates with the part 56 in taking measurements adjacent to the shoulder.

A back collar gage supporting member 70, consisting of a semi-rigid gas-tube-like structure is supported at its lower end in an upstanding position by means of a rear bracket arm 71 which is carried by the bar 15 and extends backwardly therefrom. Said member 70 carries at its upper end a globular head 72 which is gripped friction tight between the concave clamping portion 73 of the member 74 which supports an arcuate yoke piece or plate 75 having secured to its concave face a neck pad 76. The upper end portion of a calibrated, pendant tape 76t for determining the "depth of scye" measurements is secured by means of glue, or otherwise, between the midlength portion of the neck pad 76 and its arcuate support 75, as indicated by dotted lines in Fig. 9.

Said member 74 is channel shaped in cross section, having at each side a depending flange 74a shown in section in Fig. 9 and indicated by dotted lines in Fig. 6. The member 74 and its arcuate yoke piece 75 are preferably both made of a single piece of sheet metal. It has a universal joint connection with the globular head 72 of the semi-rigid supporting member 70.

Said plate 75 carries keepers 77 to receive at each side the free end portion 57 of (already mentioned) strap which unwinds from a roll 80, rotatably supported by a pendant pin 81a, in turn supported by one end portion of the cross arm 81 carried by said member 74. Each arm flange 74a has through it an aperture 83 adjacent to the roll 80, through which the strap enters and near its front end another aperture 84 through which the strap issues.

This measurement taking device is simple in construction, considering the variety and number of accurate measurements that can be carried out by means of its use. Owing to its supporting wheeled base it can be conveniently and quickly brought into operative relation to the back of a customer while he or she is in a standing posture.

Preparatory to taking measurements around the shoulder the finger 46, pivotally carried by each carriage 45, should be adjusted to its down, outwardly directed position wherein it parallels its bar 32. Then the operator proceeds to wheel the apparatus close to the back of the person to be measured who should at first raise his arms to admit parts of the apparatus beneath them. Gage bars 32 are then placed under his arms, and then the set screw 17, near the top of the main support 11, is loosened allowing the bars 32 to rise until arrested by contact with the under sides of the arms close to the arm hole. Then the member 70 is bent forwardly until the pad of the yoke plate 75 is brought into contact with the basal part of the back of the neck. The front end portions of straps 57 are then pulled forward and attached to their anchor screws 46a. Depth of arm-hole gage bars 56 are then moved to their operative positions and allowed to rest upon the shoulders. The apparatus is thus properly set for taking all measurements, which procedure will readily be understood by persons skilled in the art to which the invention pertains.

One important detail of the invention pertains to the automatically retractable straps 57, the spring reels of which keep them taut while positioned for taking measurements.

For clearness of illustration, in the lower portion of Fig. 7, the back-engaging section 35 of the horizontal side gage bar 31 is shown swung to an inwardly directed position, but it is to be understood that, in practice said section or arm 35 will be directed toward the midwidth of the apparatus preparatory to wheeling the apparatus up to an adjacent relation of the back of the person to be measured. The tripodal form of the wheeled base 10, when said base is rotationally positioned as shown in Fig. 1, makes it possible to bring the tubular part 11 of the self-supporting standard close to the median line of the back of a person to be measured while he is in a standard posture.

It should be understood that the present disclosure is for the purpose of illustration only and that this invention includes all modifications and equivalents which fall within the scope of the subject matter claimed.

What is claimed is:

1. In a measurement taking apparatus for tailors including an arcuate yoke and a neck pad secured to the concave face of said yoke, a portable standard, ball joint means adjustably carried by said standard and operatively connected to said yoke for universally positioning said neck pad in an abutting relation to the posterior basal part of a customer's neck, a calibrated tape, and a reel carried by said yoke, said tape being windable upon and unwindable from said reel.

2. In a measurement taking apparatus for tailors, two telescopic members supportable from the floor in an upstanding position, a horizontally swingable gage bar including a horizontally swingable back section carried by the uppermost of said members for an upwardly abutting engagement with the customer's arm adjacent to the armpit, a spring acting between said two telescopic members and tending to move them farther apart, and means to take measurements from said gage bar to other portions of the customer's body.

3. In a measurement taking apparatus for tailors, a main upstanding support, a U-shaped bracket having one of its limbs connected with said support in a vertically adjustable relation thereto, and measurement indicating means mounted upon the other limb of said bracket in a vertically adjustable relation thereto.

4. In a measurement taking apparatus for tailors, a main upstanding support, a vertically adjustable horizontal crossbar mounted thereon, horizontally extensible carrier rods mounted upon the opposite end portions of said crossbar, and a bar mounted upon each of said carrier rods, at least one of said bars being swingable through an angle materially greater than ninety degrees from an outwardly directed position to a contacting relation to the armpit of the costumer.

5. In a measurement taking apparatus for tailors, mounting means, a side gage-bar including a horizontally swingable back section supported by said means to pivot about a vertical axis for extension from the back of a person being measured to a position wherein a portion of said bar projects forwardly of his armpit while yieldingly engaging the under inner portions of the arms, a neck-engaging member supportable by said mounting means in a contacting relation to the back of the aforesaid person's neck, and a calibrated tape carried by said neck-engaging member for taking measurements to the aforesaid forwardly projecting portion of said gage bar.

6. In a measurement taking apparatus for tailors, a self supporting portable upright standard having a socket extending downwardly into its upper end portion, a horizontal tubular cross bar having a lower end portion occupying said socket with a slidable fit, a spring within said socket in engagement with the lower end of said bar, and an assembly of measurement indicating parts carried by said bar certain of the latter parts being slidably mounted in the tubular portions of said cross bar, said assembly including spring pressed gage bars to engage the under inner portions of the arms of a person being measured, and said spring having sufficient strength to raise said bar and assembly of parts carried thereby against the opposition of gravity.

7. In a measurement taking apparatus for tailors, two telescopic members supportable from the floor in an upstanding position, a gage bar carried by the uppermost of said members for an upwardly abutting engagement with the customer's arm adjacent to the armpit, a spring acting between said telescopic members and tending to move them farther apart, and means to take measurements from said gage bar to other portions of the customer's body, said measurement taking means including an angular shoulder gage bar having a limb to rest upon the shoulder and a calibrated downwardly directed limb mounted upon the uppermost of said telescopic members in a vertically adjustable relation thereto, said limbs directly joining each other.

8. In a measurement taking apparatus for tailors, mounting means, a gage bar supported by said means for extension from the back of a person being measured to a position wherein a portion of said bar projects forwardly of his armpit, a neck-engaging member supportable by said mounting means in a contacting relation to the back of the aforesaid person's neck, a calibrated tape carried by said neck-engaging member for taking measurements to the aforesaid forwardly projecting portion of said gage bar, and an upwardly swingable arm carried by the aforesaid forward projection of said gage bar to which said tape is securable.

9. In a measurement taking apparatus for tailors, a self supporting portable upright standard having a socket extending downwardly into its upper end portion, a bar having a lower end portion occupying said socket with a slidable fit, a spring within said socket in engagement with the lower end of said bar, an assembly of measurement indicating parts carried by said bar, said assembly including gage bars to engage the under inner portions of the arms of a person being measured, said spring having sufficient strength to raise said bar and assembly of parts carried thereby against the opposition of gravity, and means whereby said gage bars are pivotally attached to their supporting means to swing inwardly and outwardly in a horizontal plane to and from their operative positions.

10. In a measurement taking apparatus for tailors, a main upstanding support, a U-shaped bracket having one of its limbs connected with said support in a vertically adjustable relation thereto, measurement indicating means mounted upon the other limb of said bracket in a vertically adjustable relation thereto, said measurement indicating means including a pendant arm in a telescopic, vertically adjustable relation to that limb of the bracket which supports it, and a compression spring acting between said limb and arm.

11. In a measurement taking apparatus for tailors, an upstanding self supporting standard, a neck saddle abuttable against the posterior basal part of a customer's neck, an elongated semi-rigid member including a universal joint construction whereby said neck saddle is supported upon said standard for positioning in an abutting relation to the customer's neck as aforesaid, an unconfined calibrated tape, means whereby an upper portion of said tape is fastened to said neck saddle, thereby maintaining said tape in a pendant position to measure distances from said neck saddle to points therebelow upon the customer's body, and horizontally swingable and vertically adjustable means supported by said standard along with said neck saddle to engage under the shoulder portions of the arms of the customer, a portion of the last recited means including a hinged section extending horizontally across the back when the latter means is thus engaged under the arms, the distance between said neck saddle and said horizontally extending portion of the last mentioned means being indicated by said pendant tape.

12. In a measurement taking apparatus for tailors, a main upstanding support, a vertically adjustable horizontal cross bar mounted thereon, horizontally extensible carrier rods mounted upon the opposite end portions of said cross bar, a bracket connected to the outer extremity of said carrier rods to pivot about a vertical axis, and measurement indicating means connected to said brackets to pivot about a vertical axis.

13. In a measurement taking apparatus for tailors, a main upstanding support, a vertically adjustable horizontal cross bar mounted thereon, horizontally extensible carrier rods mounted upon the opposite end portions of said cross bar, U-shaped brackets having one of their limbs each connected with said carrier rods to pivot about a vertical axis, and measurement indicating means mounted upon the other limb of each of said brackets in a vertically adjustable relation thereto.

14. In a measurement taking apparatus for tailors, a main upstanding support, a vertically adjustable horizontal cross bar mounted thereon, horizontally extensible carrier rods mounted upon the opposite end portions of said cross bar, U-shaped brackets having one of their limbs each connected to said carrier rods to pivot about a vertical axis, measurement indicating means turnably mounted upon the other limb of each of said brackets in a vertically adjustable relation thereto, said turnably mounted means engaging the under inner portions of the arms of a person being measured, and a horizontally swingable back section connected to said turnably mounted means.

15. In a measurement taking apparatus for tailors, a main upstanding support, a vertically adjustable horizontal cross bar mounted thereon, horizontally extensible carrier rods mounted upon the opposite end portions of said cross bar, U-shaped brackets having one of their limbs each connected with said carrier rods to pivot about a vertical axis, a side arm section swingably mounted upon the other limb of each of said brackets, and a horizontally swingable back section connected to each of said side arm sections.

16. In a measurement taking apparatus for tailors, a main upstanding support, a vertically adjustable horizontal tubular cross bar mounted thereon, polygonal horizontally extensible carrier rods slidably mounted upon the opposite end portions of said cross bar, said carrier rods constituting one arm of a jointed bracket which carries at its outer end a vertical, tubular cross arm, a screw threaded hanger rod turnably fitted within each of said vertical arms, a U-shaped bracket pivotally connected to each of said hanger rods, and measurement indicating means mounted upon the other limb of said bracket in a vertically adjustable relation thereto.

17. In measurement taking apparatus for tailors, mounting means, a gage bar supported by said means for extension from the back of a person being measured to a position wherein a portion of said bar projects forwardly of his armpit, a neck-engaging member supportable by said mounting means in a contacting relation to the back of the aforesaid person's neck, a calibrated tape carried by said neck-engaging member, a carriage slidably mounted upon the aforesaid forward projection of said gage bar, and pivoted means carried by said carriage to which said tape is securable.

18. In a measurement taking apparatus for tailors, mounting means including a vertically adjustable spring pressed side gage bar to engage the under inner portion of the arm of a person being measured, a calibrated angular depth of armhole gage bar slidably and turnably carried by said side bar for extension from the back of a person being measured to a position wherein a portion of said depth of armhole gage bar projects forwardly of his arm pit while resting upon the shoulder, a neck-engaging member supportable by said mounting means in a contacting relation to the back of the aforesaid person's neck, and a calibrated type carried by said neck-engaging member for taking measurements to the aforesaid forwardly projecting portion of said depth of armhole gage bar.

GEORGE K. MANUS.